(12) United States Patent
Azem

(10) Patent No.: US 12,082,033 B2
(45) Date of Patent: *Sep. 3, 2024

(54) IDENTIFYING A WORST INTERFERING SECTOR

(71) Applicant: T-Mobile Innovations LLC, Overland Park, KS (US)

(72) Inventor: Khaled Azem, Sterling, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,770

(22) Filed: May 11, 2023

(65) Prior Publication Data
US 2023/0284069 A1 Sep. 7, 2023

Related U.S. Application Data

(63) Continuation of application No. 17/242,397, filed on Apr. 28, 2021, now Pat. No. 11,689,952.

(51) Int. Cl.
| | |
|---|---|
| *H04W 24/10* | (2009.01) |
| *H04B 17/345* | (2015.01) |
| *H04W 24/02* | (2009.01) |
| *H04W 24/08* | (2009.01) |

(52) U.S. Cl.
CPC .......... *H04W 24/10* (2013.01); *H04B 17/345* (2015.01); *H04W 24/02* (2013.01); *H04W 24/08* (2013.01)

(58) Field of Classification Search
CPC ...... H04W 24/06; H04W 24/08; H04W 24/10
See application file for complete search history.

(56) References Cited

U.S. PATENT DOCUMENTS

| | | |
|---|---|---|
| 5,655,217 A | 8/1997 | Lemson |
| 5,862,479 A | 1/1999 | Cutler, Jr. et al. |
| 6,256,477 B1 | 7/2001 | Eidson et al. |
| 6,771,934 B2 | 8/2004 | Demers et al. |
| 7,348,930 B2 | 3/2008 | Lastinger et al. |
| 7,751,822 B2 | 7/2010 | Hyslop et al. |
| 7,848,782 B2 | 12/2010 | Stern-Berkowitz et al. |
| 8,032,142 B2 | 10/2011 | Carter et al. |
| 8,165,073 B2 | 4/2012 | Wang et al. |
| RE44,237 E | 5/2013 | McHenry |
| 8,483,620 B2 | 7/2013 | Horn et al. |
| 8,614,964 B1 | 12/2013 | Vargantwar et al. |
| 8,781,400 B2 | 7/2014 | Lindhoff et al. |
| 8,971,818 B2 | 3/2015 | Maaref et al. |
| 9,025,478 B2 | 5/2015 | Jung et al. |
| 9,094,986 B2 | 7/2015 | Horn et al. |
| 9,167,451 B2 | 10/2015 | Kim et al. |
| 9,185,614 B2 | 11/2015 | Das et al. |
| 9,253,699 B2 | 2/2016 | Choi et al. |

(Continued)

*Primary Examiner* — Kevin Kim
(74) *Attorney, Agent, or Firm* — Jones Robb, PLLC

(57) ABSTRACT

Identifying a worst interfering sector includes obtaining co-channel signal measurements within an area of interest, narrowing the signal measurements to a specific frequency band associated with at least one serving sector, determining one or more ratios of a sum of interfering signal measurements to a sum of serving signal measurements, and identifying the worst interfering sector for the specific frequency band based on a highest ratio from among the one or more ratios.

20 Claims, 5 Drawing Sheets

(56) References Cited

U.S. PATENT DOCUMENTS

| | | |
|---|---|---|
| 9,277,487 B2 | 3/2016 | Wang et al. |
| 9,288,772 B2 | 3/2016 | Vrzic et al. |
| 9,350,477 B1 | 5/2016 | Jung et al. |
| 9,402,195 B2 | 7/2016 | Burley |
| 9,450,694 B1 | 9/2016 | Jung et al. |
| 9,490,953 B2 | 11/2016 | Yanover et al. |
| 9,510,237 B2 | 11/2016 | Nuss et al. |
| 9,516,657 B2 | 12/2016 | Marinier et al. |
| 9,544,857 B2 | 1/2017 | Carter et al. |
| 9,648,569 B2 | 5/2017 | Madan |
| 9,655,102 B2 | 5/2017 | Uplenchwar et al. |
| 9,763,103 B2 | 9/2017 | Claussen et al. |
| 10,075,858 B2 | 9/2018 | Park et al. |
| 2004/0185864 A1 | 9/2004 | Balachandran et al. |
| 2005/0271012 A1 | 12/2005 | Agrawal et al. |
| 2006/0068715 A1 | 3/2006 | Hundal et al. |
| 2006/0135169 A1 | 6/2006 | Sampath et al. |
| 2007/0242647 A1 | 10/2007 | Bennett |
| 2008/0031197 A1 | 2/2008 | Wang et al. |
| 2009/0197588 A1 | 8/2009 | Khandekar et al. |
| 2011/0244870 A1 | 10/2011 | Lee |
| 2012/0250521 A1 | 10/2012 | Marinier et al. |
| 2013/0005269 A1 | 1/2013 | Lindoff et al. |
| 2013/0044621 A1 | 2/2013 | Jung et al. |
| 2013/0088986 A1 | 4/2013 | Xiao et al. |
| 2013/0116011 A1 | 5/2013 | Lee et al. |
| 2013/0121187 A1 | 5/2013 | Das et al. |
| 2013/0295946 A1 | 11/2013 | Panchal et al. |
| 2014/0185483 A1 | 7/2014 | Kim et al. |
| 2014/0274094 A1 | 9/2014 | Abdelmonem et al. |
| 2014/0295871 A1 | 10/2014 | Ahn et al. |
| 2014/0307713 A1 | 10/2014 | Lindoff et al. |
| 2014/0315593 A1 | 10/2014 | Vrzic et al. |
| 2015/0085753 A1 | 3/2015 | Chen et al. |
| 2015/0139188 A1 | 5/2015 | Tidestav et al. |
| 2015/0163681 A1 | 6/2015 | Sadek |
| 2015/0271764 A1 | 9/2015 | Agrawal et al. |
| 2015/0282206 A1 | 10/2015 | Kalhan et al. |
| 2015/0289282 A1 | 10/2015 | Phuyal et al. |
| 2015/0318945 A1 | 11/2015 | Abdelmonem et al. |
| 2015/0341939 A1 | 11/2015 | Sharma et al. |
| 2016/0019701 A1 | 1/2016 | Visser et al. |
| 2016/0037525 A1 | 2/2016 | Malmirchegini et al. |
| 2016/0044689 A1 | 2/2016 | Wen et al. |
| 2016/0237525 A1 | 2/2016 | Malmirchegini et al. |
| 2016/0080047 A1 | 3/2016 | Lastinger et al. |
| 2016/0088575 A1 | 3/2016 | Xu et al. |
| 2017/0041117 A1 | 2/2017 | Marinier et al. |
| 2017/0063484 A1 | 3/2017 | Naghshvar et al. |
| 2017/0085428 A1 | 3/2017 | Barros et al. |
| 2017/0117997 A1 | 4/2017 | Park et al. |
| 2017/0181182 A1 | 6/2017 | Patel et al. |
| 2017/0201892 A1 | 7/2017 | Wen et al. |
| 2017/0272131 A1 | 9/2017 | Ananth et al. |
| 2018/0070241 A1 | 3/2018 | Harel |
| 2018/0124792 A1 | 5/2018 | Khoshnevisan et al. |
| 2018/0294827 A1 | 10/2018 | Abdelmonem |
| 2019/0020392 A1 | 1/2019 | Butler et al. |
| 2019/0052294 A1 | 2/2019 | Abdelmonem |
| 2019/0124584 A1 | 4/2019 | Parikh et al. |
| 2019/0141641 A1 * | 5/2019 | Abdelmonem ..... H04W 52/243 |
| 2020/0120518 A1 | 4/2020 | Geng et al. |

\* cited by examiner

IDENTIFYING A WORST INTERFERING SECTOR

This patent application is a continuation of U.S. patent application Ser. No. 17/242,397, filed Apr. 28, 2021, which is incorporated by reference in its entirety for all purposes.

TECHNICAL BACKGROUND

As wireless networks evolve and grow, there are ongoing challenges in communicating data across such wireless networks. For example, a wireless network may include one or more access nodes, such as base stations, for providing wireless voice and data service to wireless devices in various coverage areas of the one or more access nodes. Further, access nodes may deploy radio air interfaces using one or more frequency bands or sub-bands, which enable wireless devices to connect (or "attach") to each access node. When two or more adjacent access nodes each deploy a wireless air interface using the same frequency band or similar frequencies, and when the coverage areas of these wireless air interfaces overlap, wireless devices within these overlapping coverage areas may experience interference, which may be referred to as "co-channel interference". For example, in the uplink direction, co-channel interference occurring at a serving access node may be caused by multiple wireless devices transmitting to one or more access nodes adjacent to the serving access node. Further, co-channel interference may occur due to two or more access nodes transmitting signals in the downlink direction, wherein wireless devices in an overlapping region of coverage areas of the two or more access nodes experience co-channel interference from their respective non-serving access nodes. Further, these problems are compounded when multiple access nodes each deploy wireless air interface resources that utilize multiple frequency bands, resulting in multiple co-channel overlapping areas within a wireless network.

Overview

Exemplary embodiments described herein include methods, systems, and processing nodes for determining a worst interfering sector from among a group of neighboring and serving sectors in a shared or common serving area. An exemplary method for identifying a worst interfering sector includes obtaining a plurality of signal measurements within an area of interest of the wireless network, the signal measurements being associated with a plurality of neighboring sectors and at least one serving sector, narrowing the plurality of signal measurements to a specific frequency band associated with the at least one serving sector, determining, from the plurality of signal measurements associated with the specific frequency band, one or more ratios of a sum of interfering signal measurements to a sum of serving signal measurements, and identifying the worst interfering sector for the specific frequency band based on a highest ratio from among the one or more ratios.

An exemplary system for determining a worst interfering sector in a wireless network comprises a plurality of access nodes configured to deploy a corresponding plurality of sectors over a geographic area, and a processing node communicatively coupled to one or more of the plurality of access nodes. The processing node is configured to perform operations comprising obtaining a plurality of signal measurements within an area of interest of the geographic area, the signal measurements being associated with the plurality of sectors, narrowing the plurality of signal measurements to a specific frequency band associated with at least one serving sector, determining, from the plurality of signal measurements associated with the specific frequency band, one or more ratios of a sum of interfering signal measurements to a sum of serving signal measurements, and identifying the worst interfering sector for the specific frequency band based on a highest ratio from among the one or more ratios.

An exemplary processing node for identifying a worst interfering sector in a wireless network is configured to perform operations comprising obtaining a plurality of signal measurements within an area of interest of the wireless network, the signal measurements being associated with a plurality of neighboring sectors and at least one serving sector, narrowing the plurality of signal measurements to a specific frequency band associated with the at least one serving sector, determining, from the plurality of signal measurements associated with the specific frequency band, one or more ratios of a sum of interfering signal measurements to a sum of serving signal measurements, and identifying the worst interfering sector for the specific frequency band based on a highest ratio from among the one or more ratios.

DETAILED DESCRIPTION

Figure 1:
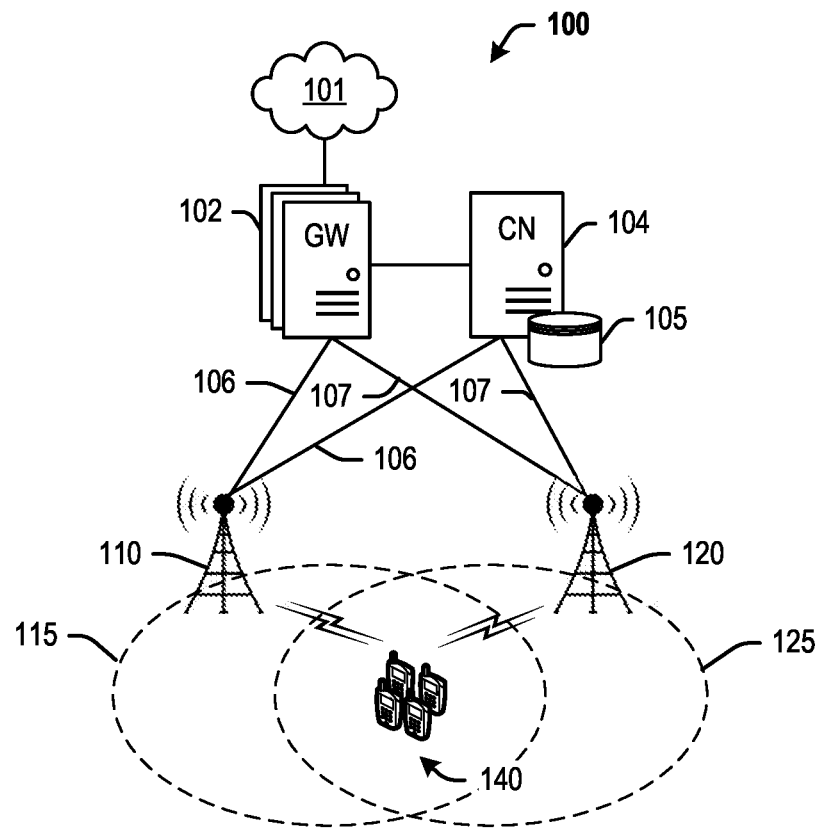
FIG. 1 depicts an exemplary system for determining a worst interfering sector in a wireless network.

This disclosure provides methods and systems for determining a worst co-channel interfering sector from among a group of neighboring and serving sectors over a common coverage area of a wireless network. A specific geographic area of interest can be defined based on interference levels measured in the common coverage area. One or more wireless devices can obtain signal measurements performed at multiple locations within the specific geographic area of interest. The worst co-channel interfering sector can be determined using the signal measurements. As described herein, the area of interest can be served by various different frequencies or frequency bands. For example, a specific frequency band can be based on a E-UTRA Absolute Radio Frequency Channel Number (EARFCN) or NR Absolute Radio Frequency Channel Number (NR-ARFCN. Thus, the signal measurements can be performed (or sorted) for specific EARFCNs/NR-ARFCNs individually, so as to determine a worst-interfering sector for a specific EARFCN/NR-ARFCN (or frequency). A threshold number of signal measurements may be obtained to enable determination of the worst-interfering sector, by multiple wireless devices at various locations. The threshold number can be configurable depending on a quantity of serving and neighboring sectors (and/or access nodes) covering the geographic area of interest, and on the size of the geographical area of interest. These operations can be repeated for different frequencies or EARFCNs/NR-ARFCNs.

Determining the worst-interfering sector from the plurality of measurements can include series of operations, such as limiting the measurements to a specific frequency/EARFCN/NR-ARFCN, and limiting the area of interest.

Limiting the area of interest can be based on interference measurements, such as serving to signal interference gap (SSIG) determined from signal measurements. For example, the geographic area of interest can be where the SSIG amounts meet or exceed a threshold SSIG. Similarly, dropped calls, service interruptions, or other metrics can be used to define the geographic area of interest. Further, a sum of serving signal levels (e.g. signal levels measured by a wireless device for reference signal levels from a serving access node or sector) can be determined, and similarly, a sum of neighboring signal levels (e.g. signal levels measured by the wireless device for reference signals from a neighboring access node or sector) can be determined. Each sum can further be equivalent to an average measurement for each neighboring/serving sector times the number of samples. A ratio of the sums is determined, and sectors associated with a highest ratio are determined as the worst interfering sectors.

Upon this determination of the worst interfering sectors, various interference-mitigation actions may be performed to ameliorate the co-channel interference. This can include instructing the access nodes associated with the worst interfering sectors to deploy their respective radio air interfaces over a reduced coverage area. A size of each reduced coverage areas is based on an amount of interference determined between the radio air interfaces. Reducing the coverage areas minimizes an overlap region of same-frequency (i.e. co-channel) coverage areas. Different-frequency (i.e. non co-channel) coverage areas can be maintained at default levels, enabling wireless devices to perform seamless handovers to different sectors and/or frequencies, and avoiding coverage gaps. Deploying radio air interfaces over reduced coverage areas can be performed by reducing a power of said respective radio air interfaces, adjusting an antenna tilt, adjusting an antenna orientation, and so on. A same power may be maintained for each frequency, while a coverage area of said each frequency can be adjusted via an orientation, tilt, beamforming, azimuth, etc.

These operations may be repeated to identify multiple interfering sectors within a geographical region, and rank the interfering sectors starting from the worst-interfering sector. Further, these operations can be performed repeatedly for specific time intervals, such as a transmission time interval, or a specified number of subframes. Further, these operations may be incorporated within a system or processing node in a wireless network. The processing node may be coupled to a first access node, a second access node, a controller node, or any other network node capable of performing the operations described herein. These and additional embodiments are further described with reference to FIGS. 1-5 below.

FIG. 1 depicts an exemplary system 100 for identifying a worst interfering sector. System 100 comprises a communication network 101, gateway 102, controller node 104, access node 110, access node 120, and wireless devices 140. Access nodes 110, 120 can be any network node configured to provide communication between wireless devices 140 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In other embodiments, access nodes 110, 120 can be a small access node including a microcell access node, a picocell access node, a femtocell access node, or the like such as a home NodeB or a home eNodeB device. In either case, each access node 110, 120 can deploy one or more radio air interfaces that utilize one or more frequency bands, enabling wireless communication with wireless devices 140. In this exemplary embodiment, access node 110 deploys a radio air interface over a coverage area 115, and access node 120 deploys a radio air interface over a coverage area 125. Further as shown herein, wireless devices 140 are in an overlapping area of coverage areas 115, 125. Although access nodes 110, 120 and wireless devices 140 are illustrated in FIG. 1, any number of access nodes and wireless devices can be implemented within system 100.

Further, as described herein, potentially interfering regions may be defined as regions where coverage areas of each access node 110, 120 overlap. For example, coverage areas 115 and 125 may share a common frequency band. Consequently, if a wireless device attached to one of access nodes 110, 120 enters the overlapping region (as shown herein), transmissions to said wireless device may be subject to interference from the other of access node 110, 120. To mitigate this interference, it is helpful to accurately identify a source of the interference and, in particular, a highest contributor. Thus, for the purposes of this disclosure, a worst interfering sector is one of a plurality of access nodes that contributes the most to co-channel interference. While only two access nodes are illustrated in FIG. 1, additional access nodes may be included as potential contributors to interference experienced by wireless devices 140.

Therefore, system 100 may be configured to perform operations described herein for identifying a worst interfering sector. A processing node within system 100 (for example, a processing node communicatively coupled to access nodes 110, 120, and/or controller node 104, or any combination thereof) may be configured to obtain a plurality of signal measurements within an area of interest defined by a portion of the overlapping areas of coverage areas 115 and 125, narrowing the plurality of signal measurements to a specific frequency band associated with at least one serving sector (e.g. as deployed by one of access nodes 110, 120), determining, from the plurality of signal measurements associated with the specific frequency band, one or more ratios of a sum of interfering signal measurements to a sum of serving signal measurements, and identifying the worst interfering sector for the specific frequency band based on a highest ratio from among the one or more ratios. Signal measurements from neighboring access nodes that have fewer than a threshold quantity of signal measurements can be discarded. Further the area of interest within the overlapping coverage area can be based on one or more of a SSIG threshold, a dropped call threshold, SINR below a threshold while serving sector RSRP is above a threshold, or similar metric evident to skilled persons in light of this disclosure. The SSIG is the difference between the power measurement of the serving access node and the aggregated power measurement of the neighboring access nodes. This difference may exceed a threshold in order to determine if a potential interference exists for the specific location. In an exemplary embodiment, the SSIG threshold is determined based on measurements performed by wireless devices 140 within and adjacent the area of interest. While the SSIG provides potential for interference or potential to have poor SINR, the area of interest can be determined using actual SINR measurements as well (e.g. during peak traffic). In an exemplary embodiment, the measurements are narrowed to a specific frequency band that is identified based on a EARFCN or NR-ARFCN. Further, it may be determined that the sum of serving signal measurements associated with the specific frequency band is zero. For example, a neighboring access node may not be serving any wireless devices 140 within the area of interest. In this case, the neighboring sector with a highest absolute value of its sum of interfering signal measurements is designated as the worst interfering sector.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 140 may be any device, system, combination of devices, or other such communication platform capable of communicating wirelessly with access nodes 110, 120 using one or more frequency bands of a radio-air interface deployed therefrom. Wireless devices 140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), 5G NR, or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access nodes 110, 120 and wireless devices 140, such as known distances and/or locations of access nodes 110, 120, geographical sizes of coverage areas 115, 125, locations of overlap regions, locations of wireless devices 140, signal measurements and interference levels experienced thereat, and so on. This information may be requested by or shared with access nodes 110,120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101. In an exemplary embodiment, a processing node can include a virtual server, a smart router, or any combination of a processor, memory, and network interface. Processing nodes may be positioned anywhere within system 100, including within a core network communicatively coupled to access node(s) 110, 120, or a radio access network (RAN) associated with one or both of access nodes 110 and 120. Thus, the operations described herein can be performed by one or more processing nodes distributed across system 100 depending on a network implementation.

Figure 2:
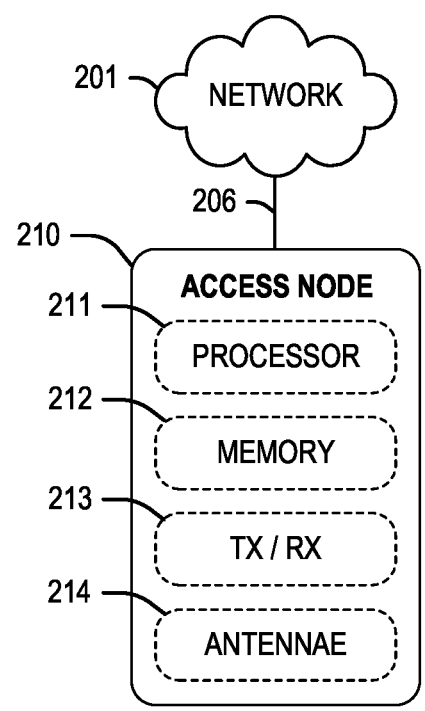
FIG. 2 depicts an exemplary access node.

FIG. 2 depicts an exemplary access node 210. Access node 210 is configured as an access point for providing network services from network 201 to end-user wireless devices via a radio-air interface deployed therefrom. Access node 210 is illustrated as comprising a processor 211, a memory 212 for storing one or modules including the operations recited herein (that are performed by processor 211), a transceiver 213, and antennae 214 for deploying a radio air interface. One pair of transceiver and antennae are illustrated herein solely to simplify the written description, and it may be evident to those having ordinary skill in the art, that any combination of transceivers and antennae may be incorporated in order to deploy carriers of multiple frequencies, formed beams, MU-MIMO data streams, and/or to facilitate communication with other network nodes on network 201. Further, access node 210 is communicatively coupled to network 201 via communication interface 206, which may be any wired or wireless link as described above.

Figure 3:
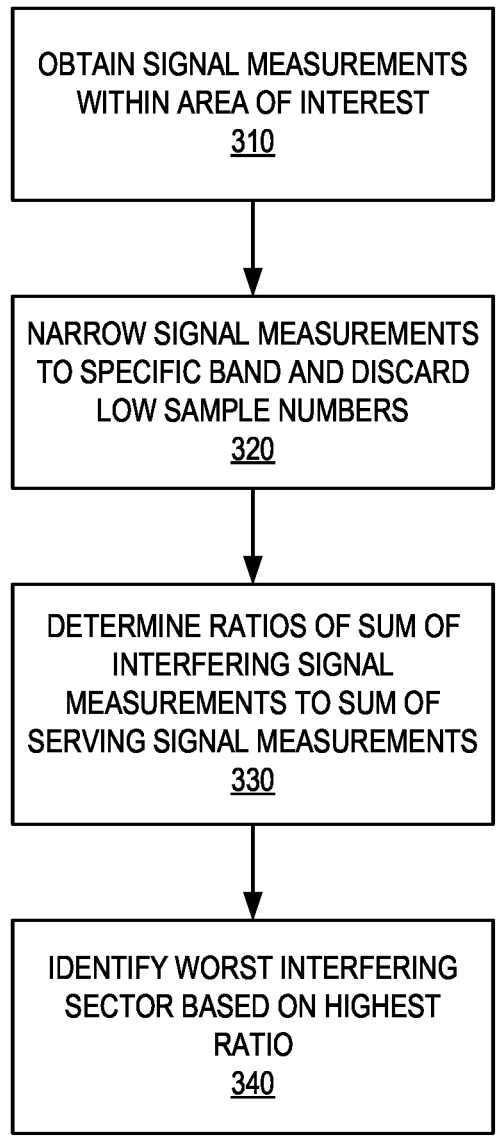
FIG. 3 depicts an exemplary method for determining a worst interfering sector.

FIG. 3 depicts an exemplary method for identifying a worst interfering sector. The method of FIG. 3 is illustrated with respect to an access node, a controller node, or any other network node capable of performing the operations described herein. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 310, signal measurements are obtained within an area of interest. The signal measurements can be performed by wireless devices (e.g. mobile phones) by measuring signal strength (e.g. RSRP) for a plurality of sectors sharing a common coverage area. The sectors can be deployed by one or more access nodes and utilize one or more frequency bands. For example, a wireless network may comprise two or more access nodes that are configured to provide communication between wireless devices and other network nodes within or outside the wireless network. The access nodes can include standard access nodes and/or short range, low power, small access nodes, with standard access nodes including macrocell access nodes, base transceiver stations, radio base stations, next generation or gigabit NodeBs (gNBs) in 5G networks, or enhanced eNodeBs (eNBs) in 4G/LTE networks, and small access nodes including microcell access nodes, picocell access nodes, femtocell access nodes, or home NodeB or eNodeB devices. In either case, each access node can deploy one or more radio air interfaces that utilize one or more frequencies, enabling wireless communication with the wireless devices that are within a coverage area of each access node. Potentially interfering regions may be defined as regions where coverage areas of each access node that share a common frequency band overlap over a geographical region. Consequently, if a wireless device attached to one of the access nodes via said common frequency band enters the overlap region, transmissions to said wireless device may be subject to interference from the other access node. Further, co-channel interference occurring at a serving access node may be caused by multiple wireless devices within an overlapping or interference region transmitting signals to one or more access nodes adjacent to the serving access node. Thus, the wireless devices may perform multiple measurements of signal power at various locations, and submit to the network measurements recorded at each location or store them for further processing. The measurements may be performed periodically or triggered by the network. Further, additional wireless devices may be configured to submit measurements performed at several specific locations within the network. In an exemplary embodiment, the signal power measurements can be recorded on wireless devices during drive testing using, for instance, a drive test tool or application on the wireless device that further reports the measurements to the network for processing.

At 320, signal measurements are narrowed to a specific band or frequency band (e.g. EARFCN or NR-ARFCN), and sectors associated with low numbers of measurements are discarded from the determination of the highest interfering sector. The threshold number of signal measurements may be required to enable accurate determination of the worst-interfering sector. This is because a number of measurements lower than the threshold number can overestimate the impact of a particular interfering sector, and result in a wrong conclusion of the worst interfering sector. The threshold number can be configurable depending on a quantity of serving and neighboring sectors (and/or access nodes) covering the geographic area of interest, and on the size of the geographical area of interest. Sectors associated with frequencies/EARFCNs/NR-ARFCNs for which there is a below-threshold number of measurements are discarded.

At 330, a ratio of a sum of interfering measurements to a sum of serving signal measurements is determined. A sum of serving signal levels (e.g. signal levels measured by a wireless device for reference signal levels from a serving access node or sector) can be determined, and similarly, a sum of neighboring signal levels (e.g. signal levels measured by the wireless device for reference signals from a neighboring access node or sector) can be determined. Each sum can further be equivalent to an average measurement for each neighboring/serving sector times the number of samples. A ratio of the sums is determined, and at 340, the worst interfering sector is one that has the highest ratio. The ratio is calculated for each serving and neighboring sector, or primary cell identifier (PCI). For example, each access node serving a common coverage area can be configured to deploy different sectors that use different frequencies, over different geographical areas referred to as "sectors." Multiple carriers of an access node may broadcast their own PCI. PCI numbers are reused (not unique) and must be associated with other identifiers (e.g., EARFCN and eNodeB ID or gNodeB ID) to refer to a specific sector.

Further, one or more Pas of the worst interfering sectors can be divided into two groups or categories. Each PCI in each group is associated with an absolute value of the sum of the neighboring signal levels is >>1, which ensures that a high measurement sample size is used. This filtering can be performed in addition to (or alternatively to) the narrowing and discarding step 320. Further, if the sum of serving signal levels is zero, then the PCI with the highest absolute value of the sum of neighboring signal levels is chosen or designated as the worst interfering sector. Whereas, if the sum of serving signal levels is non-zero, then the PCI associated with the highest ratio of sums is chosen or designated as the worst interfering sector.

Figure 4:
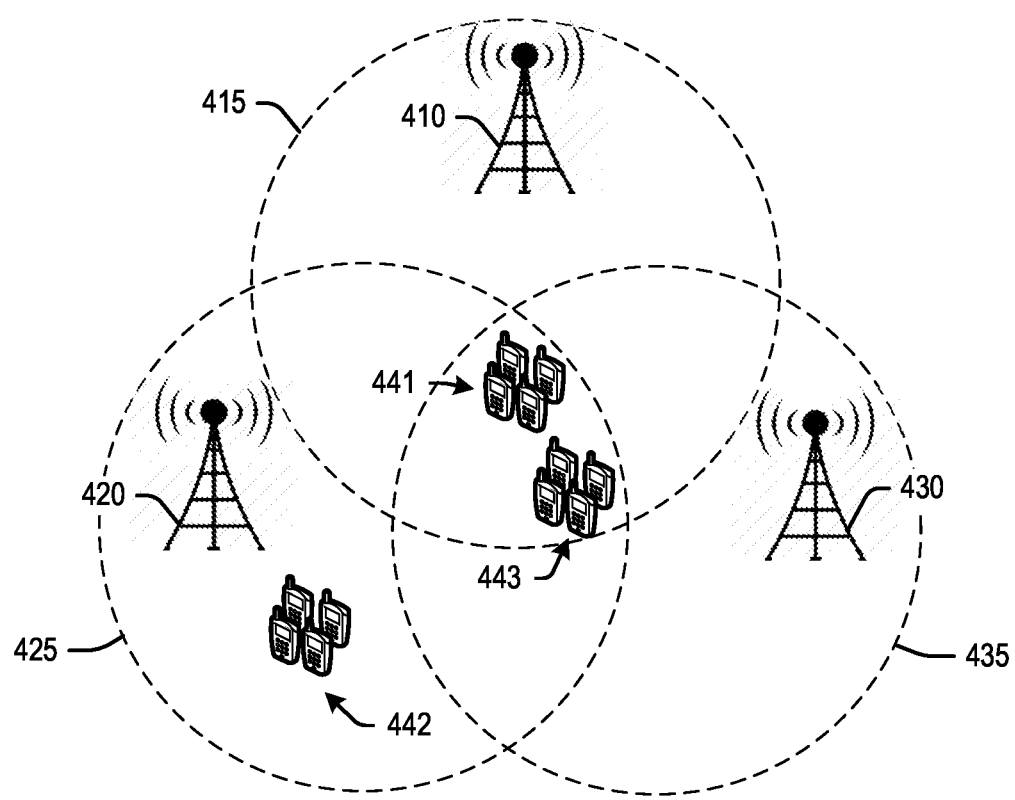
FIG. 4 depicts an exemplary arrangement of serving and neighboring sectors.

FIG. 4 illustrates an exemplary arrangement of access nodes and sectors deployed therefrom. Access nodes 410, 420, and 430 can be any network node configured to provide network access to wireless devices 441, 442, 443, including standard access nodes and/or short range, low power, small access nodes. For instance, access nodes 410-430 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In other embodiments, access nodes 410-430 can be a small access node including a microcell access node, a picocell access node, a femtocell access node, or the like such as a home NodeB or a home eNodeB device. In either case, each access node 410-430 can deploy one or more radio air interfaces that utilize one or more frequencies, enabling wireless communication with wireless devices attached thereto. In this exemplary embodiment, access node 410 deploys a radio air interface over a coverage area 415, access node 420 deploys a radio air interface over a coverage area 425, and access node 430 deploys a radio air interface over a coverage area 435. Further as shown herein, wireless devices 441, 443 are in an overlapping area of coverage areas 415, 425, 435, and wireless devices 442 are outside of the overlapping coverage area. Further, it is to be understood that wireless devices 441 are attached to access node 410, wireless devices 442 are attached to access node 420, and wireless devices 443 are attached to access node 430. It is to be further understood that, for the purposes of this disclosure, the term "sector" and "access node" can be interchangeable, since each access node is deploying a single sector. In other configurations, a single access node can deploy a plurality of sectors. Further, although access nodes 410, 420, 430 and wireless devices 441, 442, 443 are illustrated in FIG. 4, any number of access nodes and wireless devices can be implemented.

Further, as described herein, potentially interfering regions may be defined as regions where coverage areas of sectors deployed by each access node 410-430 overlap. For example, coverage areas 415, 425, and 435 may share a common frequency band. Consequently, wireless devices 441, 443 in the overlapping region (as shown herein) may be subject to interference from the other of access node 410, 420, 430. To mitigate this interference, it is helpful to accurately identify a source of the interference and, in particular, a highest contributor. Thus, for the purposes of this disclosure, a worst interfering sector is one of a plurality of access nodes that contributes the most to co-channel interference. Therefore, a processing node communicatively coupled to one or more of access nodes 410-430 can be configured to obtain a plurality of signal measurements within an area of interest defined by a portion of the overlapping areas of coverage areas 415-435, narrowing the plurality of signal measurements to a specific frequency band associated with at least one serving sector (e.g. as deployed by one of access nodes 410-430), determining, from the plurality of signal measurements associated with the specific frequency band, one or more ratios of a sum of interfering signal measurements to a sum of serving signal measurements, and identifying the worst interfering sector for the specific frequency band based on a highest ratio from among the one or more ratios. Signal measurements from neighboring access nodes that have fewer than a threshold quantity of signal measurements can be discarded. Further the area of interest within the overlapping coverage area can be based on one or more of a SSIG threshold, a dropped call threshold, or similar metric evident to skilled persons in light of this disclosure. In an exemplary embodiment, the SSIG threshold is determined based on measurements performed by wireless devices 441, 443 within and adjacent the area of interest.

In an exemplary embodiment, the measurements are narrowed to a specific frequency band that is identified based on a EARFCN or NR-ARFCN. Further, the measurements indicate which sector or access node is a neighbor or serving access node. For example, wireless devices 441 would report measurements from reference signals associated with access nodes 420 and 430 as neighboring signal measurements, and from reference signals associated with access node 410 as serving signal measurements. Further, wireless devices 443 would report measurements from reference signals associated with access nodes 410 and 420 as neighboring signal measurements, and from reference signals associated with access node 430 as serving signal measurements. Finally, it is evident that since wireless devices 442 are not in the geographic area of interest, there is no measurement report of access node 420 as a serving sector. Thus, it may be determined that the sum of serving signal measurements associated with access node 420 zero, since it is a neighboring access node that is not serving any wireless devices within the area of interest. In this case, the neighboring sector (deployed by access node 420) with a highest absolute value of its sum of interfering signal measurements may be designated as the worst interfering sector. Whereas, between access nodes 410, 430, a ratio of the sum of neighboring reference signal measurements to the sum of serving reference signal measurements would yield the worst interfering sector (being the one with the highest ratio of sums).

Figure 5:
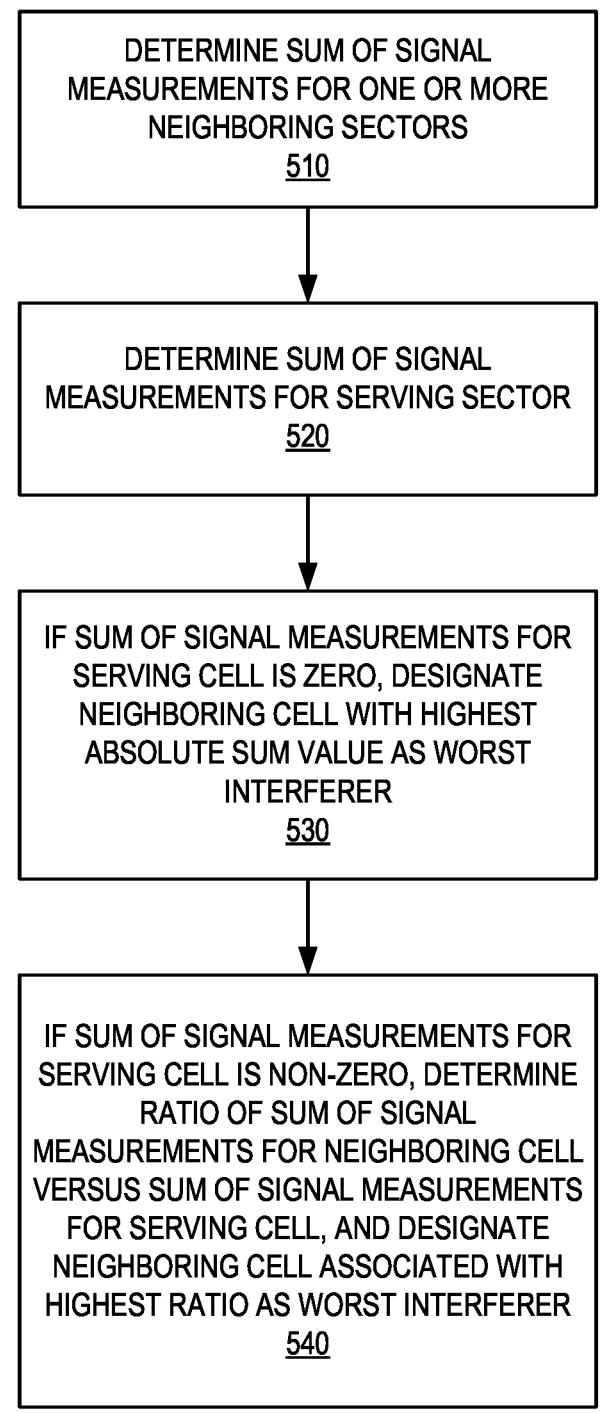
FIG. 5 depicts another exemplary method for determining a worst interfering sector.

FIG. 5 illustrates another method for identifying a worst interfering sector. The method of FIG. 5 is illustrated with respect to an access node, a controller node, or any other network node capable of performing the operations described herein. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a sum of signal measurements is computed for one or more neighboring sectors, and at 520, a sum of signal measurements is computed for a serving sector. For the purposes of this sector, the terms "neighboring" and "serving" are relative to a wireless device performing the signal measurements. The signal measurements can be obtained for an area of interest. The signal measurements can be performed by wireless devices (e.g. mobile phones) by measuring signal strength (e.g. RSRP) for a plurality of sectors sharing a common coverage area. The sectors can be deployed by one or more access nodes and utilize one or more frequency bands. For example, a wireless network may comprise two or more access nodes that are configured to provide communication between wireless devices and other network nodes within or outside the wireless network. The access nodes can include standard access nodes and/or short range, low power, small access nodes, with standard access nodes including macrocell access nodes, base transceiver stations, radio base stations, next generation or gigabit NodeBs (gNBs) in 5G networks, or enhanced eNodeBs (eNBs) in 4G/LTE networks, and small access nodes including microcell access nodes, picocell access nodes, femtocell access nodes, or home NodeB or eNodeB devices. In either case, each access node can deploy one or more radio air interfaces that utilize one or more frequencies, enabling wireless communication with the wireless devices that are within a coverage area of each access node. Potentially interfering regions may be defined as regions where coverage areas of each access node that share a common frequency band overlap over a geographical region. Consequently, if a wireless device attached to one of the access nodes via said common frequency band enters the overlap region, transmissions to said wireless device may be subject to interference from the other access node. Thus, the wireless devices may perform multiple measurements of signal power at various locations, and submit to the network measurements recorded at each location or store them for further processing. The measurements may be performed periodically or triggered by the network. Further, additional wireless devices may be configured to submit measurements performed at several specific locations within the network.

In an exemplary embodiment, the sum of signal measurements for the one or more neighboring sectors comprises a sum of the RSRP values for each neighboring PCI, based on the measurements submitted by the wireless devices. This sum can be referred to as "Interferer RSRP SUM" or IRSRP_SUM. Further, the sum of signal measurements for the serving sectors comprises a sum of the RSRP values for each serving PCI, based on the measurements submitted by the wireless devices. This sum can be referred to as "Serving RSRP SUM" or SRSRP_SUM.

At 530, a sum of serving signal measurements (e.g. SRSRP_SUM) is determined to be zero. This is in the case that wireless devices do not report serving sector measurements for the particular sector. Since the non-serving sector is considered a neighboring access node that is not serving any wireless devices within the area of interest, the neighboring sector with a highest absolute value of its sum of interfering signal measurements may be designated as the worst interfering sector. Whereas, at 540, a ratio of the sums (computed in 510 and 520) is determined, and the worst interfering sector is one that has the highest ratio. The ratio is calculated for each serving and neighboring sector, or primary cell identifier (PCI). In an exemplary embodiment, the ratio is referred to as "PCI Interferer Ratio" or PCI_IR. Thus, for each neighboring PCI, PCI_IR=IRSRP_SUM/SRSRP_SUM where: IRSRP_SUM & SRSRP_SUM are for the same PCI.

As described herein, the worst interfering sector's PCI, among a group of neighboring PCI, are divided into 2 groups, each meeting the following criteria: the absolute value |IRSRP_SUM|>Threshold-1 and |SRSRP_SUM|>Threshold-2. Threshold-1 and Threshold-2 are arbitrary numbers that depend on the measurement sample size (e.g. the PCI with low IRSRP_SUM, i.e. low sample count, can be discarded as the worst interferer). For the PCI with SRSRP_SUM=0, the PCI with the highest absolute value |IRSRP_SUM| is the worst interfering sector among this group. For the PCI with SRSRP_SUM≠0, the PCI with the highest PCI_IR is the worst interfering sector among this group.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for identifying an interfering sector in a wireless network, comprising:
   obtaining a plurality of signal measurements associated with a specific frequency band and at least one serving sector;
   determining, from the plurality of signal measurements associated with the specific frequency band, one or more ratios of a sum of interfering signal measurements to a sum of serving signal measurements; and
   identifying the interfering sector for the specific frequency band based on a highest ratio from among the one or more ratios.

2. The method of claim 1, further comprising discarding signal measurements from neighboring access nodes that have fewer than a threshold quantity of signal measurements.

3. The method of claim 1, further comprising determining an area of interest based on one or more of a serving to signal interference gap (SSIG) threshold or a dropped call threshold.

4. The method of claim 1, wherein the interfering sector is the worst interfering sector.

5. The method of claim 1, wherein the specific frequency band is based on a E-UTRA Absolute Radio Frequency Channel Number (EARFCN).

6. The method of claim 1, further comprising determining that the sum of serving signal measurements associated with the specific frequency band is zero.

7. The method of claim 6, further comprising:
   determining a neighboring sector with a highest absolute value of its sum of interfering signal measurements; and
   designating the neighboring sector as the interfering sector.

8. A system for identifying an interfering sector in a wireless network, the system comprising:
   a plurality of access nodes configured to deploy a corresponding plurality of sectors over a geographic area; and
   a processing node communicatively coupled to one or more of the plurality of access nodes, the processing node being configured to perform operations comprising:
      obtaining a plurality of signal measurements associated with a specific frequency band and at least one serving sector;
      determining, from the plurality of signal measurements associated with the specific frequency band, one or more ratios of a sum of interfering signal measurements to a sum of serving signal measurements; and
      identifying the interfering sector for the specific frequency band based on a highest ratio from among the one or more ratios.

9. The system of claim 8, wherein the operations further comprise discarding signal measurements from neighboring access nodes that have fewer than a threshold quantity of signal measurements.

10. The system of claim 8, wherein the operations further comprise determining an area of interest based on one or more of a serving to signal interference gap (SSIG) threshold or a dropped call threshold.

11. The system of claim 8, wherein the interfering sector is the worst interfering sector.

12. The system of claim 8, wherein the specific frequency band is based on a E-UTRA Absolute Radio Frequency Channel Number (EARFCN).

13. The system of claim 8, wherein the operations further comprise determining that the sum of serving signal measurements associated with the specific frequency band is zero.

14. The system of claim 13, wherein the operations further comprise:
   determining a neighboring sector with a highest absolute value of its sum of interfering signal measurements; and
   designating the neighboring sector as the interfering sector.

15. A processing node for identifying a interfering sector in a wireless network, the processing node being configured to perform operations comprising:
   obtaining a plurality of signal measurements associated with a specific frequency band and at least one serving sector;
   determining, from the plurality of signal measurements associated with the specific frequency band, one or more ratios of a sum of interfering signal measurements to a sum of serving signal measurements; and
   identifying the interfering sector for the specific frequency band based on a highest ratio from among the one or more ratios.

16. The processing node of claim 15, wherein the operations further comprise discarding signal measurements from neighboring access nodes that have fewer than a threshold quantity of signal measurements.

17. The processing node of claim 15, wherein the operations further comprise determining an area of interest based on one or more of a serving to signal interference gap (SSIG) threshold or a dropped call threshold.

18. The processing node of claim 15, wherein the interfering sector is the worst interfering sector.

19. The processing node of claim 15, wherein the specific frequency band is based on a E-UTRA Absolute Radio Frequency Channel Number (EARFCN).

20. The processing node of claim 15, wherein the operations further comprise:
   determining that the sum of serving signal measurements associated with the specific frequency band is zero; and
   designating a neighboring sector with a highest absolute value of its sum of
   interfering signal measurements as the interfering sector.

* * * * *